Figure 1:
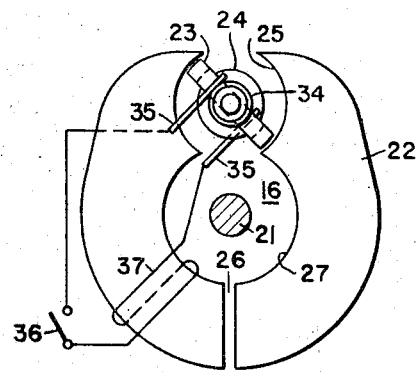

Jan. 17, 1967  R. R. CIRCLE ETAL  3,299,377
SYNCHRONOUS OPERATING MECHANISMS FOR
CONTROLLING CIRCUIT BREAKERS
Filed Feb. 17, 1965  3 Sheets-Sheet 1

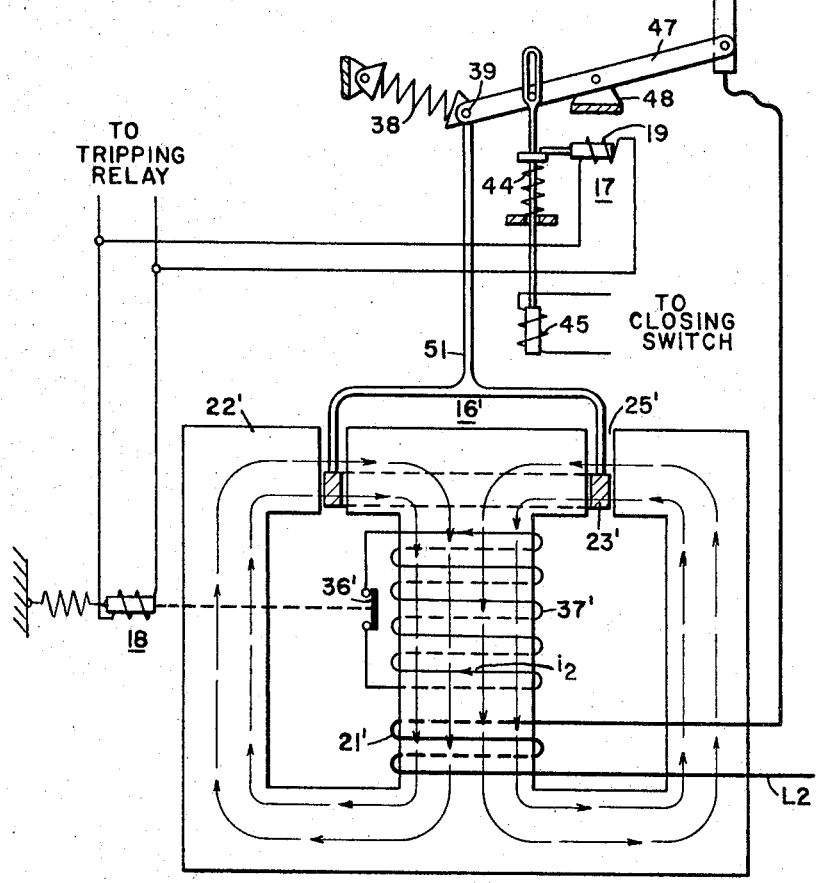

United States Patent Office 3,299,377
Patented Jan. 17, 1967

3,299,377
SYNCHRONOUS OPERATING MECHANISMS FOR CONTROLLING CIRCUIT BREAKERS
Robert R. Circle, Fairfax, Va., and Thomas E. Browne, Jr., Pittsburgh, Pa., assignors to Westinghouse Electric Corporation, Pittsburgh, Pa., a corporation of Pennsylvania
Filed Feb. 17, 1965, Ser. No. 433,407
14 Claims. (Cl. 335—19)

This invention relates, generally, to synchronous operating mechanisms for controlling circuit breakers and, more particularly to synchronous mechanisms for opening the contact members of circuit breakers just prior to a current zero of an alternating current wave in an improved manner.

Synchronously operated circuit breakers have been devised in which the breaker contacts are opened just prior to a current zero by means of a synchronous operator comprising a saturating iron core energized by the current to be interrupted and an armature coil disposed in an air gap in the core. As the current to be interrupted approaches zero, the core unsaturates and the high rate of change of flux induces a current in the armature coil. The interaction between the induced current and the flux across the air gap develops a force utilized to open the breaker contacts.

As explained in a copending application Serial No. 419,410, filed December 18, 1964, by W. M. Leeds and assigned to the Westinghouse Electric Corporation, it is sometimes necessary to keep the contacts of a circuit breaker closed during through faults when other breakers in a power system are supposed to open. In the structure disclosed in the aforesaid patent application, a mechanical latch is provided to prevent the synchronous operator from opening the breaker contacts until the latch is released by a high speed tripping device.

An object of this invention is to provide electrical means for controlling the operation of a synchronous operator to prevent a circuit breaker from being operated by the operator except under predetermined conditions.

A further object of the invention is to provide for controlling the operation of synchronous operators of either the rotatable or the rectilinearly movable type.

Another object of the invention is to provide a synchronous operator for operating a circuit breaker having a reciprocating contact member.

Other objects of the invention will be explained fully hereinafter or will be apparent to those skilled in the art.

In accordance with one embodiment of the invention, a secondary coil is wound on the core of a synchronous operator to supply current to the armature coil of the operator. A normally open switch in the coil circuit prevents current from flowing in the armature coil, thereby preventing the synchronous operator from operating at any current level. When a high speed trip magnet controlled by a tripping relay closes the switch, current flows in the armature coil, and the breaker contacts are opened just prior to the next current zero after the closing of the switch. In another embodiment, there is no separately wound secondary coil, but the armature coil itself serves as the secondary winding. Alternate methods of preventing operation of the breaker by a synchronous operator are provided.

Figure 2:
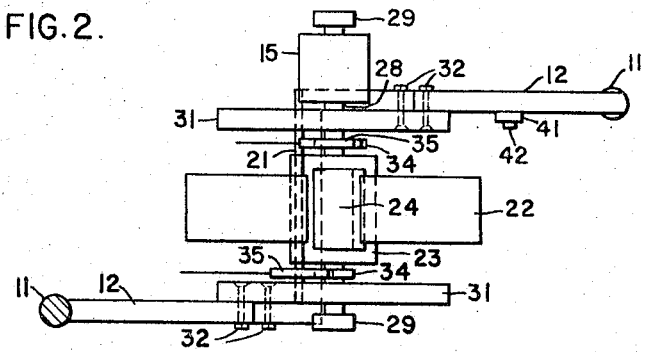
Figure 3:
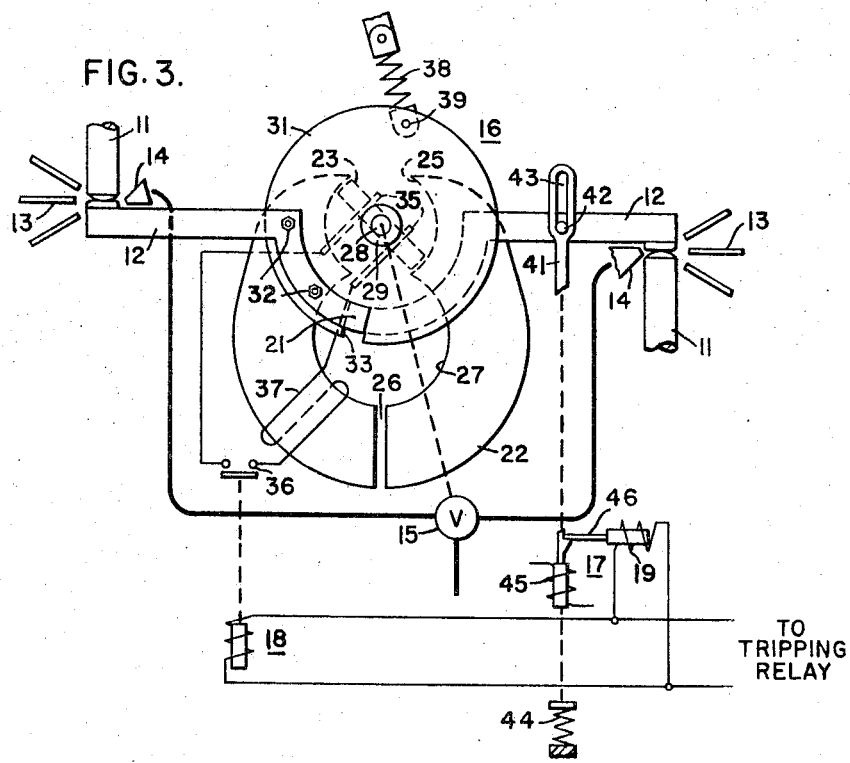

For a better understanding of the nature and objects of the invention, reference may be had to the following detailed description, taken in conjunction with the accompanying drawings, in which:

FIGURE 1 is a view, in elevation, of a synchronous operator embodying principal features of the invention;
FIG. 2 is a view, in plan, of the synchronous operator and a portion of a circuit breaker structure shown in FIG. 3;
FIG. 3 is a diagrammatic view of the circuit breaker and the synchronous operator of FIGS. 1 and 2;
FIG. 4 is a diagrammatic view of a modified synchronous operator and circuit breaker; and
FIGS. 5 to 8 are views of other modifications of synchronous operators and their controls embodying the invention.

Referring to the drawings, and particularly to FIGS. 2 and 3, the circuit breaker shown therein is generally of the type described in the aforesaid copending application. As shown, the portion of the circuit breaker structure illustrated comprises a pair of relatively stationary contact members 11, a pair of rocking contact arms 12 engaging the stationary contact members 11, arc splitters 13, blast nozzles 14, a blast valve 15, a synchronous operating device 16, a non-synchronous operating mechanism 17, a high speed tripping magnet 18, and a normal tripping solenoid 19. The structure shown may be enclosed in a suitable housing (not shown) and the contact members 11 may be connected to power conductors through terminal connectors (not shown).

As shown more clearly in FIG. 2, the contact arms are connected by a bar conductor 21 which may be formed integrally with the contact arms or may be bolted or brazed to the contact arms. Thus, when the contact arms are in the closed position, a series circuit exists through the stationary contact members 11 and the two contact arms 12. This circuit is interrupted at two places when the contact arms are actuated to the open position, thereby providing a double-break circuit breaker which is suitable for operation at relatively high voltages.

As shown more clearly in FIG. 1, the synchronous operating device 16 comprises a saturating iron core 22 and an armature coil 23 on an armature member 24 rotatably disposed in a circular air gap 25 in the core 22. The core 22 has one or more additional air gaps 26 therein and a central opening 27 therethrough. The conductor 21, which carries the current to be interrupted by the circuit breaker, extends through the central opening 27 to provide the magnetomotive force for energizing the saturating core 22.

As shown more clearly in FIG. 2, the armature member 24 and the coil 23 are carried by a shaft 28 rotatably mounted in bearings 29 which may be supported by a suitable structure (not shown). An insulating disk 31 is secured to the shaft 28 at each side of the core 22. Each contact arm 12 is attached to one of the disks 31 by bolts 32. Thus, the contact arms 12 are actuated by the rotatable coil 23. A blast valve 15, which is mounted at one end of the shaft 28, is also actuated by the coil 23, as shown, or alternately it may be operated through a lever by the normal trip solenoid 19. It will be noted that the opening 27 in the core 22 is sufficiently large to permit the bar conductor 21 to swing in an arc as the contact arms 12 rock about the axis of coil 23 and its supporting armature member 24. The conductor 21 is disposed in a notch 33 in each of one of the disks 31.

As shown more clearly in FIGS. 1 and 3, the ends of the armature coil 23 are connected to slip rings 34 engaged by brushes 35. One brush 35 is connected to one terminal of a switch 36. The other brush 35 is connected to one end of a secondary conducting means or coil 37 inductively disposed on the core 22. The other end of the conducting means 37 is connected to the other terminal of the switch 36. Thus, when the switch 36 is closed, the armature coil 23 and the secondary conducting means 37 are connected in series-circuit relation. However, when the switch 36 is open, the coil 23 is open-circuited and no current can flow in the coil. Alternately, the coil 37 may be omitted and the switch 36 utilized to open the circuit through armature coil 23.

As explained in the aforesaid copending application, the synchronous operating device 16 provides a relatively large torque for opening the circuit breaker contacts and the blast valve 15. The current to be interrupted, which flows in the primary conductor 21, provides flux which saturates the core 22. As the primary current approaches zero, the core unsaturates, and the righ rate of change of flux through the core induces a voltage in the secondary conductor or coil 37, or in the armature coil 23, or both, which causes a current to flow in the armature coil 23 when the switch 36 is closed. The interaction between the induced current in the armature coil 23 and the flux across the air gap 25 develops a torque in the shaft 28 to which the coil 23 is attached. Thus, the contact arms 12, which are also attached to the shaft 28, are rocked about the axis of the coil to open the contact members of the circuit breaker just prior to a current zero of the alternating current wave.

The blast valve 15 is also opened at this time, or earlier, to control a blast of interrupting gas, preferably $SF_6$, from a high pressure reservoir (not shown). The interrupting gas is directed by the nozzles 14 across the arcs drawn between the contact arms and the stationary contact members 11 to drive the arcs into the arc splitters 13 to extinguish the arcs. It may be arranged so that when the contacts are fully opened, the blast valve has reached a closed position, thereby keeping gas consumption to a minimum.

As shown in FIG. 3, an overcenter toggle spring 38, attached to the disks 31 by a pin 39, biases the contact arms 12 to either the closed or to the open position whenever its line of action is moved overcenter.

In order to keep the contacts of the breaker closed on through faults when other breakers in the power system are called upon to open the circuit, the switch 36 is normally open, thereby preventing current from flowing in the armature coil 23 and preventing the opening operation of the breaker. When a tripping relay operates to energize the high speed trip magnet 18, the switch 36 is closed, and, as the next zero of short-circuit current 16 is approached, the synchronous operator functions to snap the contacts open.

If a re-ignition of the arc should take place, a reversal of direction of flux in the core 22 develops a torque in the opposite direction upon shaft 28 and the contacts are immediately reclosed to carry the current another half cycle until the next current zero is approached when they are again opened, and the circuit is cleared.

The non-synchronous operating mechanism 17 is provided for low current switching operations where the torque developed by the synchronous operator 16 is too weak to overcome the force of the toggle spring 38 holding the contacts closed. An operating rod 41 is attached to one of the contact arms 12 by a lost-motion connection which includes a pin 42 disposed in a slot 43 in the end of the rod 41. The rod 41 is driven upwardly by an accelerating spring 44 which may be compressed by means of a closing solenoid 45. The rod 41 is retained in its closed position by a spring-biased latch 46, which is released by the normal tripping solenoid 19.

The high speed trip 18 and the normal trip 19 are both energized by means of a tripping relay in the usual manner. However, the lost-motion connection between the operating rod 41 and the contact arm 12 permits the high speed trip and the high speed synchronous operator to function one or two half-cycles ahead of the non-synchronous operator whenever high short circuit currents are to be interrupted. Thus, the synchronous operator opens the contact members at substantially a zero current under high short circuit conditions, and the non-synchronous operator 17 opens the contact members for a low current and load or no-load switching operations.

The non-synchronous operating mechanism 17 may be utilized to close the contact members of the breaker. When the closing solenoid 45 is energized, the operating rod 41 is pulled downwardly to swing the contact arms 12 past the overcenter position of the toggle spring 38, which then snaps the contacts arms to the fully closed position shown in FIG. 3.

As previously explained, the operating rod 41 is retained in a closed position by the latch 46 until this latch is released by the normal tripping solenoid 19. However, the lost-motion connection between the rod 41 and the contact arm 12 permits the breaker contacts to be opened by the high speed trip prior to the releasing of the latch 46. Thus, the switch 36 is always closed by the high speed trip 18 to permit the contacts to be opened by the synchronous operator under short circuit conditions since the high speed tripping device 18 is energized simultaneously with the normal tripping device 19 which is slower in operation than the high speed device 18.

In the structure shown in FIG. 4 the circuit breaker contact members 11' and 12' are enclosed in an evacuated housing 10 having a flexible bellows 20 attached thereto to provide a seal for the opening through which the movable contact member 12' enters the housing 10. The movable contact member 12' is reciprocally operated by an insulating lever 47 which is pivoted on a support 48. The lever 47 is operated by a synchronous operator 16' or by the non-synchronous mechanism 17 in the manner hereinafter described.

The synchronous operator 16' comprises a saturating core 22' and a rectilinearly movable closed-circuit armature coil 23' disposed in an air gap 25' in the core 22'. The coil 23' is connected to one end of the lever 47 by a yoke 51, which is pivotally attached to the lever 47 by the pin 39, which also attaches the overcenter toggle spring 38 to the end of the lever.

As shown, the core 22' is of the three-legged type having the primary conductor 21' wound on the middle leg of the core. One end of the coil 21' is connected to a line conductor L2 and the other end is connected to a line conductor L1 through the contact members of the circuit breaker. Thus, the coil 21' carries the line current I which is to be interrupted by the circuit breaker.

A secondary conducting means or coil 37' is also wound on the middle leg of the core 22'. When the switch 36' is closed, as shown in FIG. 4, a current $i_2$ is induced in the coil 37' which prevents the rapid rate of change of flux in the core 22', which is necessary to induce sufficient current in the armature coil 23' to provide sufficient force to open the contact members of the circuit breaker. When the switch 36' is opened, no current $i_2$ can flow in the coil 37' and the rate of change of flux in the core 22' induces a current in the armature coil 23' to open the contact members of the circuit breaker just prior to a curernt zero in the manner hereinbefore described. The switch 36' is opened by the high speed trip 18, which is energized by the operation of a tripping relay in the manner previously described. The tripping relay also controls the energization of the normal trip 19 to control the operation of the non-synchronous mechanism 17 in the manner hereinbefore described. The direction of flow of flux in the core 22' is shown by the arrows in FIG. 4.

The modified synchronous operator 16" shown in FIG. 5 has two rectilinearly movable armature coils 23' disposed in air gaps 25' in the saturating core 22". The closed circuit coils 23' may be mechanically connected together through a suitable linkage to operate a circuit breaker in a manner similar to that shown in FIG. 4. When the switch 36' is closed, the secondary conducting means or coil 37' functions in the manner hereinbefore described to prevent sufficient current being induced in the armature coils 23' to operate the circuit breaker. When the switch 36' is opened, the breaker is operated to the open position by the synchronous operator in the manner hereinbefore described.

Figure 6:
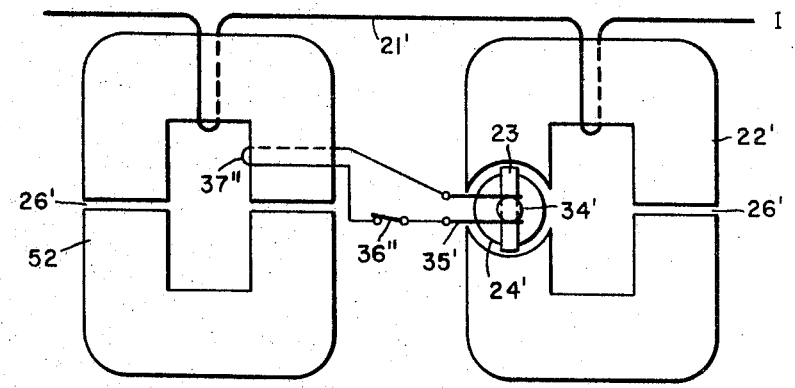

In the modification shown in FIG. 6 the armature coil 23 is of the rotatable type similar to the one shown in FIG. 1. The secondary control coil or conducting means 37″ is mounted on an additional saturating core 52 having the primary conducting means 21′ wound thereon in a manner similar to the core 22′. The secondary coil 37″ is connected in series-circuit relation with the armature coil 23 through a switch 36″ and the brushes 35 and slip rings 34. Thus, when the switch 36″ is closed, current induced in the coil 37″ flows through the armature coil 23 to operate the circuit breaker to the open position in the manner hereinbefore described. This is an action similar to that which occurs in the breaker illustrated in FIG. 3.

Figure 7:
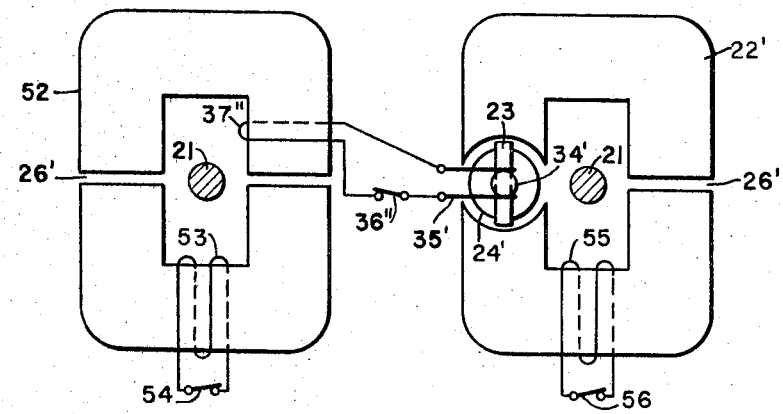

In the structure shown in FIG. 7, an additional core 52 is also provided. A control coil 53 is inductively disposed on the core 52 in addition to the coil 37″, which is connected to the armature coil 23 through the switch 36″. When a switch 54 is closed to short circuit the coil 53, this coil functions in the manner hereinbefore described to prevent current from being induced in the coil 37″ to energize the armature coil 23, thereby preventing the opening operation of the circuit breaker. However, as previously explained, when the switch 54 is opened, current is then induced in the coil 37″ which flows through the armature coil 23 to operate the breaker. An additional control coil 55 may also be provided on the core 22′. When a switch 56 is closed to short circuit this coil, it aids in preventing the opening operation of the circuit breaker by reducing the flux in the core 22′.

Figure 8:
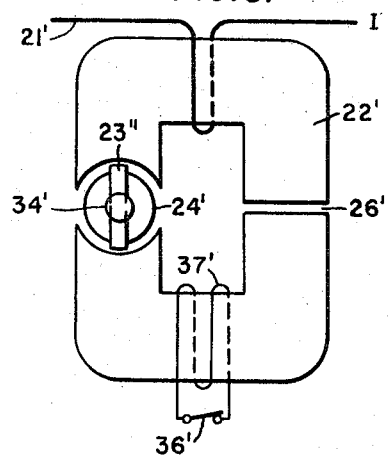

The armature coil 23″ shown in FIG. 8 is of the closed circuit rotatable type. Thus, when the switch 36′ is opened to prevent current from flowing through the control coil 37′, current is induced in the armature coil 23″ to provide a torque on the shaft 28 for operating the circuit breaker. When the switch 36′ is closed, the current induced in the coil 37′ prevents the rapid rate of change of flux in the core 22′ needed to induce sufficient current in the coil 23″ to open the breaker.

It is recognized that when the switches 36′, 54 and 56 are opened to open the circuit through any one of the control coils 36′, 54 and 56 which are normally short circuited, there may be a relatively large amount of current flowing in the particular control coil. This current will produce a momentary arc which will of necessity have a voltage drop on the order of 10 volts. This voltage will be sustained momentarily by the rising flux in the core, but after a farction of a half-cycle, the core will saturate and the control coil circuit will be completely opened.

From the foregoing description it is apaprent that the invention provides an electrical means for preventing the operation of a synchronous operator except under predetermined conditions resulting in the operation of a tripping relay or other control means. Thus, it is not necessary to provide a mechanical latch on a synchronous operator to control its operation.

Since numerous changes may be made in the above-described constructions and different embodiments of the invention may be made without departing from the spirit and scope thereof, it is intended that all subject matter contained in the foregoing description or shown in the accompanying drawing shall be interpreted as illustrative and not in a limiting sense.

We claim:

1. A synchronous-type circuit interrupter including a pair of separable contacts and a synchronous operator for controlling the opening movement of one of said contacts, said synchronous operator including a saturating iron core having an air gap therein, a current-conducting armature coil movably disposed in said air gap and mechanically connected to said one contact, primary winding means for said core carrying at least a portion of the line current flowing through the contacts, secondary winding means for controlling the induced current flow through said armature coil, switching means for said secondary winding means, and tripping means for the circuit interrupter for controlling the operation of said switching means.

2. A synchronous operator for a circuit breaker comprising a saturating iron core having an air gap therein, a current conducting armature coil movably disposed in the air gap to operate the circuit breaker, primary conducting means for energizing the core, said primary means carrying the current to be interrupted by the breaker, secondary conducting means having current induced therein and disposed to control the current in the armature coil, switching means for controlling the circuit through the secondary conducting means, and tripping means for controlling the operation of the switching means.

3. A synchronous operator for a circuit breaker having a contact member comprising a saturating iron core having an air gap therein, a current conducting armature coil movably disposed in the air gap to actuate the contact member, primary conducting means for energizing the core, said primary means carrying the current to be interrupted by the breaker, secondary conducting means having current induced therein, switching means for connecting the secondary means in series-circuit relation with the armature coil, and tripping means for closing the switching means.

4. A synchronous operator for a circuit breaker having a contact member comprising a saturating iron core having an air gap therein, a current conducting armature coil movably disposed in the air gap to actuate the contact member, primary conducting means for energizing the core, said primary means carrying the current to be interrupted by the breaker, secondary conducting means having current induced therein, switching means for closing a circuit through the secondary means, and tripping means for opening the switching means.

5. A synchronous operator for a circuit breaker having a contact member comprising a saturating iron core having an air gap therein, a current conducting armature coil movably disposed in the air gap to actuate the contact member, primary conducting means for energizing the core, said primary means carrying the current to be interrupted by the breaker, secondary conducting means having current induced therein, switching means for connecting the secondary means in series-circuit relation with the armature coil, additional secondary conducting means inductively disposed on the core, additional switching means for closing a circuit through the additional secondary means, and tripping means for controlling the operation of all the switching means.

6. A synchronous operator for a circuit breaker having a contact member comprising a saturating iron core having an air gap therein, a current conducting armature coil movably disposed in the air gap to actuate the contact member, an additional saturating core, primary conducting means for energizing both of said cores, said primary means carrying the current to be interrupted by the breaker, secondary conducting means disposed on the adidtional saturating core to have current induced therein, switching means for connecting the secondary means in series-circuit relation with the armature coil, and tripping means for controlling the operation of the switching means.

7. A synchronous operator for a circuit breaker having a contact member comprising a saturating iron core having an air gap therein, a current conducting armature coil movably disposed in the air gap to actuate the contact member, an additional saturating core, primary conducting means for energizing both of said cores, said primary means carrying the current to be interrupted by the breakers, secondary conducting means disposed on the additional saturating core to have current induced therein, switching means for connecting the secondary means in series-circuit relation with the armature coil, a control coil disposed on at least one of the cores, switching means for closing a circuit through the control coil, and tripping means for controlling the operation of both the switching means.

8. A synchronous operator for a circuit breaker having a contact member comprising a saturating iron core having an air gap therein, a current conducting armature coil movably disposed in the air gap to actaute the contact member, an additional saturating core, primary conducting means for energizing both of said cores, said primary means carrying the current to be interrupted by the breaker, secondary conducting means disposed on the additional saturating core to have current induced therein, switching means for connecting the secondary means in series-circuit relation with the armature coil, a control coil disposed on each one of the cores, switching means for closing circuits through the control coils, and tripping means for controlling all of the switching means.

9. A synchronous operator for a circuit breaker having a contact member comprising a saturating iron core having an air gap therein, a closed circuit armature coil movably disposed in the air gap to actuate the contact member, primary conducting means for energizing the core, said primary means carrying the current to be interrupted by the breaker, a control coil inductively disposed on the core, switching means for closing a circuit through the control coil, and tripping means controlling said switching means to effect opening of said switching means to thereby cause current to be induced in the aramture coil to produce a force for actuating the breaker contact member to the open position.

10. In a circuit breaker, in combination a relatively stationary contact member, a movable contact member engaging the stationary contact member, a synchronous operator having a saturating iron core and an armature coil movable to disengage said contact members, primary conducting means carrying the current to be interrupted to energize the core, secondary conducting means inductively disposed to control the current in the armature coil, switching means for controlling the circuit through the secondary conducting means, and tripping means for controlling the operation of the switching means.

11. In a circuit breaker, in combination a relatively stationary contact member, a movable contact member engaging the stationary contact member, a synchronous operator having a saturating iron core and an armature coil movable to disengage said contact members, primary conducting means carrying the current to be interrupted to energize the core, secondary conducting means inductively disposed to control the current in the armature coil, switching means for controlling the circuit through the secondary conducting means, non-synchronous means for operating the breaker through a lost-motion connection, and tripping means for controlling the operation of the switching means and the non-synchronous means.

12. In a circuit breaker, in combination, a relatively stationary contact member, a movable contact member engaging the stationary contact member, a synchronous operator having a saturating iron core and a rotatable armature coil for disengaging said contact members, primary conducting means carrying the current to be interrupted to energize the core, secondary conducting means inductively disposed to control the current in the armature coil, switching means for controlling the circuit through the secondary conducting means, and tripping means for controlling the operation of the switching means.

13. In a circuit breaker, in combination, a relatively stationary contact member, a movable contact member engaging the stationary contact member, a synchronous operator having a saturating iron core with an air gap therein and an armature coil movable rectilinearly in the air gap to disengage said contact members, primary conducting means carrying the current to be interrupted to energize the core, secondary conducting means inductively disposed to control the current in the armature coil, switching means for controlling the circuit through the secondary conducting means, and tripping means for controlling the operation of the switching means.

14. In a circuit breaker, in combination, a relatively stationary contact member, a movable contact member engaging the stationary contact member, a synchronous operator having a saturation iron core and an armature coil movable to disengage said contact members, primary conducting means carrying the current to be interrupted to energize the core, switching means for controlling the circuit through the armature coil, and tripping means for controlling the operation of the switching means.

No references cited.

BERNARD A. GILHEANY, *Primary Examiner.*

R. N. ENVALL, Jr., *Assistant Examiner.*